United States Patent
Kim et al.

(10) Patent No.: US 11,076,096 B2
(45) Date of Patent: Jul. 27, 2021

(54) METHOD FOR REMOVING OBJECT TO BE PROCESSED FROM IMAGE AND DEVICE FOR PERFORMING METHOD

(71) Applicant: LINKFLOW CO., LTD, Seoul (KR)

(72) Inventors: Yongkuk Kim, Suwon-si (KR); Sungrae Cho, Seoul (KR); Yongjin Kim, Busan (KR); Junse Kim, Gwangju-si (KR)

(73) Assignee: LINKFLOW CO., LTD, Seoul (KR)

( * ) Notice: Subject to any disclaimer, the term of this patent is extended or adjusted under 35 U.S.C. 154(b) by 0 days.

(21) Appl. No.: 16/627,028

(22) PCT Filed: Dec. 12, 2017

(86) PCT No.: PCT/KR2017/014514
§ 371 (c)(1),
(2) Date: Dec. 27, 2019

(87) PCT Pub. No.: WO2019/004530
PCT Pub. Date: Jan. 3, 2019

(65) Prior Publication Data
US 2020/0120276 A1     Apr. 16, 2020

(30) Foreign Application Priority Data
Jun. 29, 2017  (KR) .......................... 10-2017-0082441

(51) Int. Cl.
*H04N 5/232*     (2006.01)
*G06T 3/40*      (2006.01)

(52) U.S. Cl.
CPC ....... *H04N 5/23238* (2013.01); *G06T 3/4007* (2013.01)

(58) Field of Classification Search
USPC .................................................. 382/275, 284
See application file for complete search history.

(56) References Cited

U.S. PATENT DOCUMENTS

| | | | |
|---|---|---|---|
| 2014/0321771 A1* | 10/2014 | Reinisch | G06T 3/4038 382/284 |
| 2016/0050368 A1* | 2/2016 | Seo | G06T 7/194 348/36 |
| 2018/0139431 A1* | 5/2018 | Simek | H04N 13/254 |

FOREIGN PATENT DOCUMENTS

| | | |
|---|---|---|
| JP | 2009-294955 A | 12/2009 |
| JP | 2016103806 A | 6/2016 |
| KR | 10-2001-0054914 A | 7/2001 |

(Continued)

OTHER PUBLICATIONS

Nam SW, Jang KH, Ban YJ, Kim HS, Chien SI. Hole-Filling Methods Using Depth and Color Information for Generating Multiview Images. ETRI Journal. Oct. 2016;38(5):996-1007. (Year: 2016).*

(Continued)

*Primary Examiner* — Clifford Hilaire
(74) *Attorney, Agent, or Firm* — Maier & Maier, PLLC

(57) ABSTRACT

The present disclosure relates to a method for removing an object to be processed from an image and a device for performing the method. A method for removing an object to be processed from an image can comprise the step of: an image processing device deciding an object to be processed in an image; and the image processing device performing image post-processing with respect to the object to be processed, wherein the object to be processed can be an object which is unintentionally captured.

10 Claims, 12 Drawing Sheets

(56) References Cited

FOREIGN PATENT DOCUMENTS

KR  10-2014-0045834 A   4/2014
KR  10-2016-0003614 A   1/2016
KR  10-2016-0144149 A   12/2016

OTHER PUBLICATIONS

International Search Report dated Mar. 21, 218 in corresponding International application No. PCT/KR2017/014514; 4 pages.
Japanese Office Action dated Jan. 26, 2021, in connection with corresponding JP Application No. 2019-571484 (7 pp., including machine-generated English translation).

* cited by examiner

FIG. 3
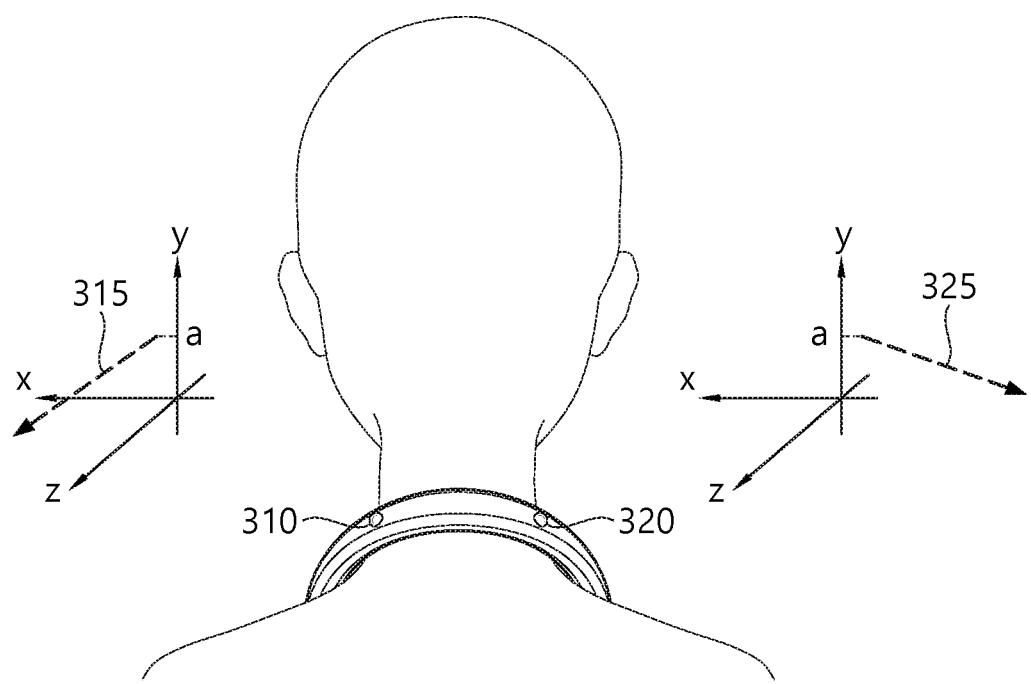
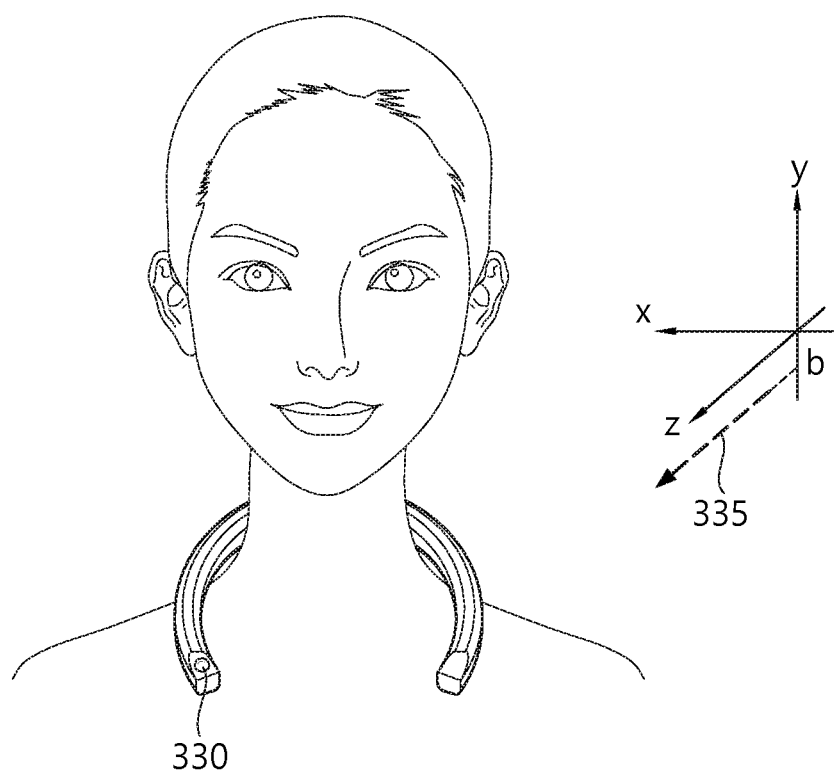

FIG. 6
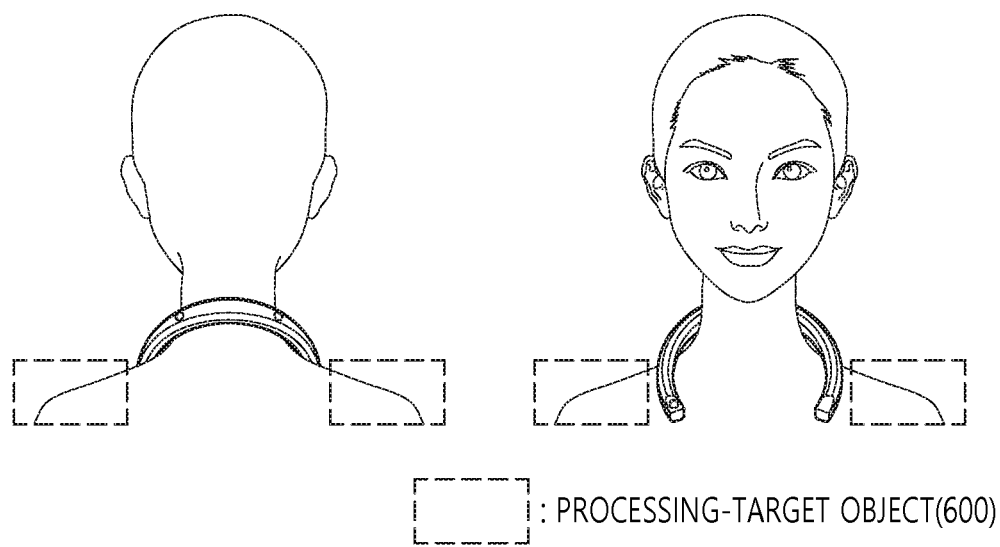
: PROCESSING-TARGET OBJECT(600)
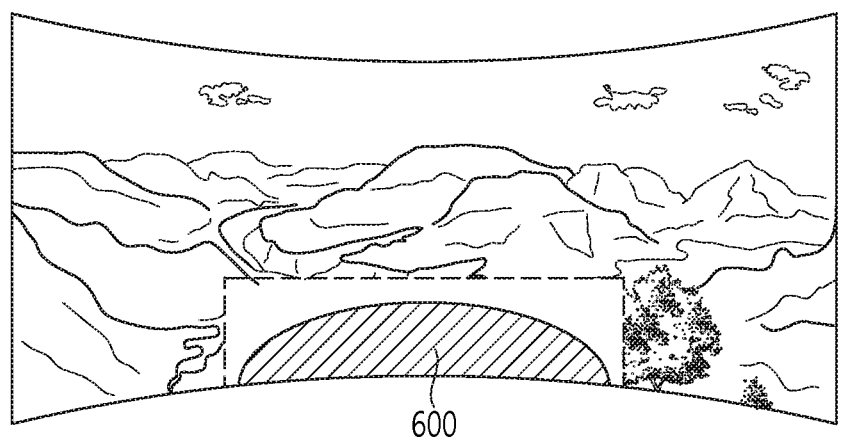
600
: DETERMINATION-TARGET REGION(650)

FIG. 12
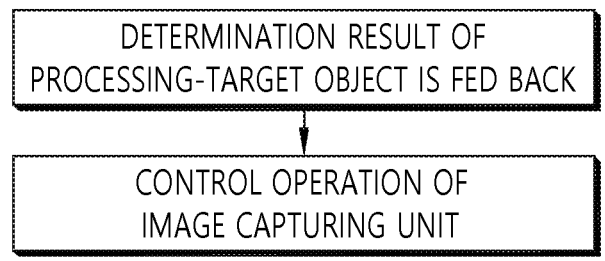
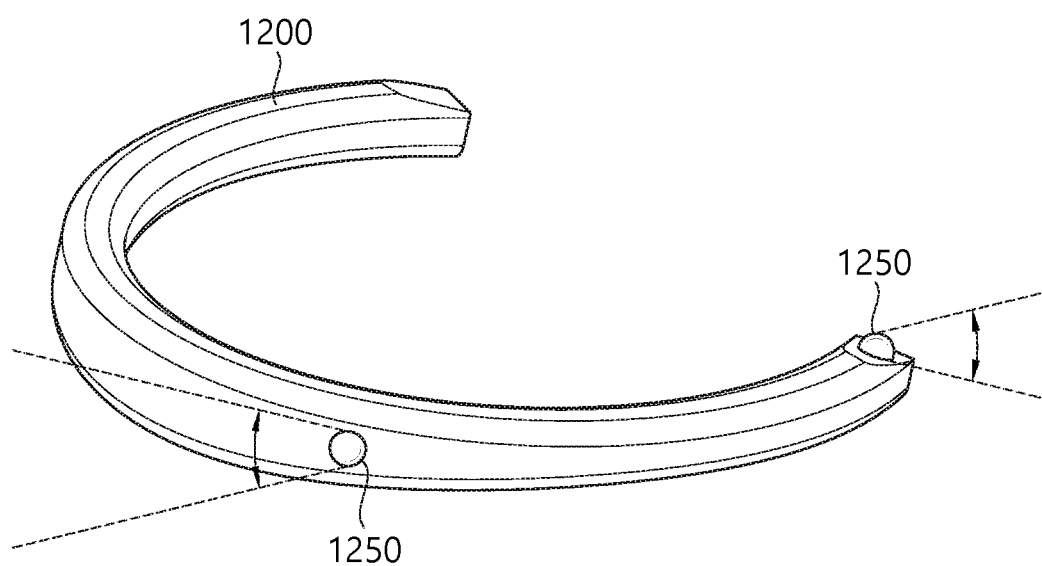

METHOD FOR REMOVING OBJECT TO BE PROCESSED FROM IMAGE AND DEVICE FOR PERFORMING METHOD

FIELD

The present invention relates to a method of removing a processing-target object from an image and a device for performing the method. More particularly, the present invention relates to an image processing method and device for removing an object unnecessarily (or inappropriately) included in moving image information captured by an image processing device through image post-processing.

BACKGROUND

An omnidirectional imaging system is an imaging system capable of recording image information of all directions (360 degrees) from a particular point. Since the omnidirectional imaging system can provide very wide field-of-view images, as compared to an existing imaging system, the range of applications of the omnidirectional imaging system has increasingly been broadened not only to research fields such as the fields of computer vision and mobile robots, but also to practical fields such as the fields of surveillance systems, virtual reality systems, and pan-tilt-zoom (PTZ) cameras, and video conferencing.

Various methods can be used to obtain an omnidirectional image. For example, images may be obtained by rotating one camera with respect to an optical axis that satisfies a single view point, and an omnidirectional image may be generated by combining the images. In another example, a method may be used in which a plurality of cameras are arranged into an annular structure and images obtained by the plurality of cameras are combined. A user may generate an omnidirectional image using various omnidirectional image processing apparatuses (or omnidirectional image processing cameras) for obtaining an omnidirectional image.

When an omnidirectional image is generated by an omnidirectional image processing device, an object may be unnecessarily (or inappropriately) imaged, and it is necessary to post-process the unnecessarily (or inappropriately) imaged object.

The present invention is directed to solving all the problems described above.

The present invention is also directed to deciding an unnecessarily (or inappropriately) imaged object as a processing-target object in an omnidirectional image captured by an omnidirectional image processing device and processing the processing-target object in the omnidirectional image through image post-processing.

The present invention is also directed to generating a natural omnidirectional image through image interpolation after image post-processing with respect to a processing-target object in an omnidirectional image even if the processing-target object is removed.

Also, exemplary embodiments of the present inventive concept

According to an aspect of the present inventive concept, a method of removing a processing-target object from an image includes determining, by an image processing device, the processing-target object in the image and performing, by the image processing device, image post-processing with respect to the processing-target object, wherein the processing-target object is an object which has been unintentionally imaged.

According to another aspect of the present inventive concept, An image processing device for removing a processing-target object from an image, the image processing device includes a communication unit configured to communicate with an external device and a processor configured to be operatively connected to the communication unit, wherein the processor decides the processing-target object in the image and performs image post-processing with respect to the processing-target object, and the processing-target object is an object which has been unintentionally imaged.

According to exemplary embodiments of the present inventive concept, an unnecessarily (or inappropriately) imaged object is decided as a processing-target object in an omnidirectional image captured by an omnidirectional image processing device and is processed as the processing-target object in the omnidirectional image through image post-processing.

In addition, according to exemplary embodiments of the present inventive concept, a natural omnidirectional image is generated through image interpolation after image post-processing with respect to a processing-target object in an omnidirectional image even if the processing-target object is removed.

BRIEF DESCRIPTION OF DRAWINGS

FIG. 3 is a schematic view illustrating image capturing lines of a plurality of image capturing units according to an exemplary embodiment of the present inventive concept.

FIG. 6 is a set of conceptual diagrams illustrating a method of deciding a determination-target region according to an embodiment of the present invention.

FIG. 12 is a conceptual diagram illustrating operation of an omnidirectional image processing device according to an embodiment of the present invention.

DETAILED DESCRIPTION

Figure 1:
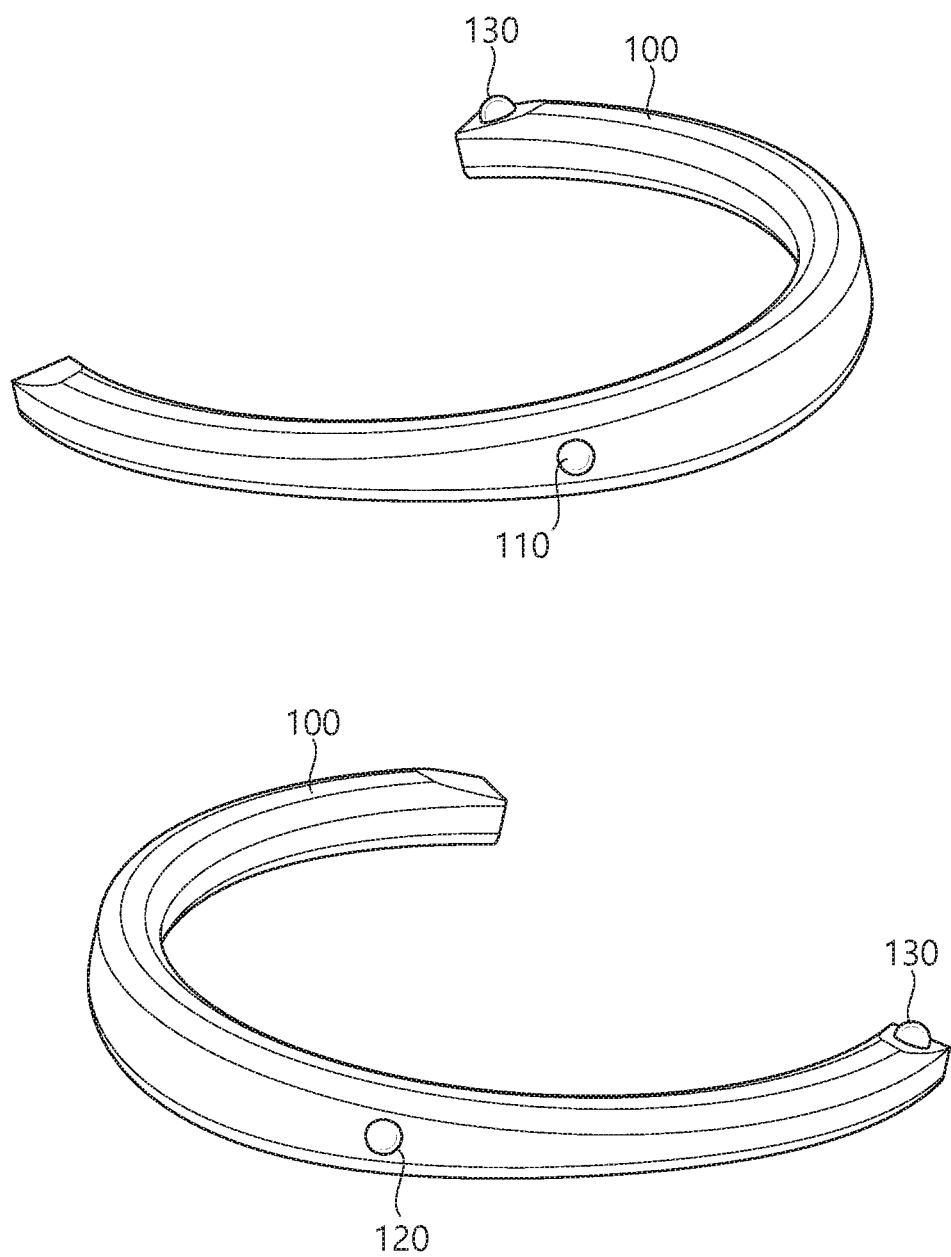
FIG. 1 is a schematic view illustrating an omnidirectional image processing apparatus according to an exemplary embodiment of the present inventive concept.

In the following detailed description of the present inventive concept, references are made to the accompanying drawings that show, by way of illustration, specific embodiments in which the present inventive concept may be practiced. These embodiments are described in sufficient detail to enable those skilled in the art to practice the present inventive concept. It is to be understood that the various embodiments of the present inventive concept, although different from each other, are not necessarily mutually exclusive. For example, specific shapes, structures and characteristics described herein may be implemented as modified from one embodiment to another without departing from the spirit and scope of the present inventive concept. Furthermore, it shall be understood that the locations or arrangements of individual components within each embodiment may also be modified without departing from the spirit and scope of the present inventive concept. Therefore, the following detailed description is not to be taken in a limiting sense, and the scope of the present inventive concept is to be taken as encompassing the scope of the appended claims and all equivalents thereof. In the drawings, like reference numerals refer to the same or similar elements throughout the several views.

Hereinafter, preferred embodiments of the present inventive concept will be described in detail with reference to the accompanying drawings to enable those skilled in the art to easily implement the present inventive concept.

Hereinafter, an image processing device according to an embodiment of the present invention may include an omnidirectional image processing device. The omnidirectional image processing device may include an omnidirectional camera (a 360-degree camera) capable of imaging all directions (or a 360-degree image).

In addition, hereinafter, image information and moving image information mentioned in embodiments of the present invention may include an omnidirectional image (or a 360-degree image).

FIG. 1 is a schematic view illustrating an omnidirectional image processing apparatus according to an exemplary embodiment of the present inventive concept.

The structure of the omnidirectional image processing apparatus according to an exemplary embodiment of the present inventive concept is as illustrated in FIG. 1.

Referring to FIG. 1, an omnidirectional image processing apparatus 100 may have a wearable structure and may have a necklace-like shape that can be worn around the neck of a user. The omnidirectional image processing apparatus 100 may be in the shape of an open necklace that is open on one side thereof, as illustrated in FIG. 1, or in the shape of a non-open necklace. In the description that follows, it is assumed that the omnidirectional image processing apparatus 100 has a U shape that is open on one side thereof. The omnidirectional image processing apparatus 100, which is U-shaped, may be worn around the neck of the user as a wearable device and may be able to capture an omnidirectional image.

For convenience, it is assumed that the omnidirectional image processing apparatus 100 is worn around the neck of the user in the shape of a necklace (or in the shape of an open necklace that is open on one side thereof or in a U shape). However, the omnidirectional image processing apparatus 100 may not necessarily be worn around the neck of the user. For example, the omnidirectional image processing apparatus 100 may acquire an omnidirectional image by being hung on/attached to other parts of the body of the user or an external object.

The user can wear the omnidirectional image processing apparatus 100 around his or her neck and can thus acquire a plurality of images for generating an omnidirectional image with both hands free.

The omnidirectional image processing apparatus 100 may include a plurality of image capturing units. The plurality of image capturing units may be provided in the omnidirectional image processing apparatus 100 to be a particular distance (or a predetermined distance) apart from one another and may independently capture images in accordance with a predetermined field of view/image capturing line. The locations of the plurality of image capturing units may be fixed in the omnidirectional image processing apparatus 100, or the plurality of image capturing units may be movable so that their locations may vary.

For example, the omnidirectional image processing apparatus 100 may include three image capturing units, and the three image capturing units may capture an omnidirectional image with a predetermined field of view (e.g., 120 degrees to 180 degrees). The three image capturing units may be first, second, and third image capturing units 110, 120, and 130.

For convenience, an omnidirectional image processing apparatus 100 including three image capturing units will be described below. However, the omnidirectional image processing apparatus 100 may be modified to include a plurality of image capturing units other than three (e.g., two, four, five, or six image capturing units) to capture an omnidirectional image, without departing from the spirit and scope of the present inventive concept.

The first, second, and third image capturing units 110, 120, and 130 may capture an image in accordance with a predetermined field of view. At given time resources, a first image may be generated by the first image capturing unit 110, a second image may be generated by the second image capturing unit 120, and a third image may be generated by the third image capturing unit 130. The first, second, and third image capturing units 110, 120, and 130 may have a field of view of 120 degrees or greater, and there may exist overlapping areas between the first, second, and third images. Thereafter, an omnidirectional image may be generated by stitching together and/or correcting the first, second, and third images, which are captured at the given time resources by the omnidirectional image processing apparatus 100. The stitching and/or the correcting of a plurality of images may be performed by the omnidirectional image processing apparatus or may be performed by a user device (such as a smartphone) that can communicate with the omnidirectional image processing apparatus 100. That is, additional image processing for a plurality of images generated may be performed by the omnidirectional image processing apparatus 100 and/or another image processing apparatus (such as a smartphone, a personal computer (PC), or the like).

The characteristics of the omnidirectional image processing apparatus and an omnidirectional image generation method will hereinafter be described.

Figure 2:
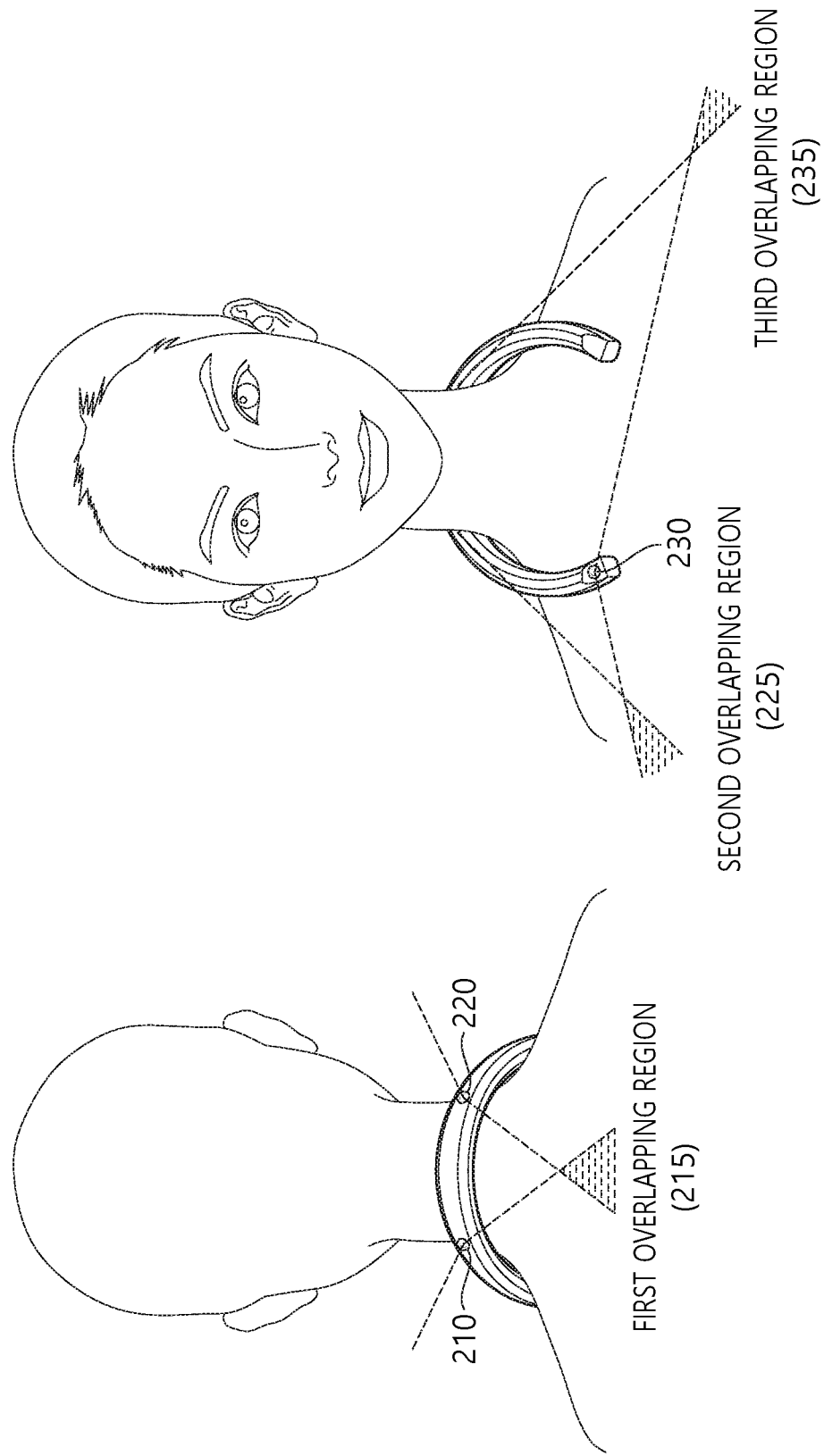
FIG. 2 is a schematic view showing the characteristics of a plurality of image capturing units provided in the omnidirectional image processing apparatus according to an exemplary embodiment of the present inventive concept.

FIG. 2 is a schematic view showing the characteristics of a plurality of image capturing units provided in the omnidirectional image processing apparatus according to an exemplary embodiment of the present inventive concept.

FIG. 2 shows the characteristics of a plurality of image capturing units provided in a U-shaped omnidirectional image processing apparatus. The locations of the plurality of image capturing units illustrated in FIG. 2 are merely exemplary. The plurality of image capturing units may be disposed at various locations in the omnidirectional image processing apparatus to capture a plurality of images for generating an omnidirectional image.

The rear of the omnidirectional image processing apparatus is as illustrated in the upper part of FIG. 2.

First and second image capturing units 210 and 220, which are included in the omnidirectional image processing apparatus, may be located at a curved part of the omnidirectional image processing apparatus where curvature is present. Specifically, when a user wears the omnidirectional image processing apparatus around his or her neck as a wearable device, the first and second image capturing units 210 and 220 may be provided at the curved part of the omnidirectional image processing apparatus that is in contact with the back of the neck of the user. For example, the first and second image capturing units 210 and 220 may be a predetermined distance apart from a point on the U-shaped omnidirectional image processing apparatus with a maximum curvature (e.g., the middle part of the U-shaped omnidirectional image processing apparatus).

The first image capturing unit 210 may capture an image of a region including a rear left blind spot with respect to the user's line of sight. The second image capturing unit 220 may capture an image of a region including a rear right blind spot with respect to the user's line of sight. Specifically, the first image capturing unit 210 may have a first field of view and may capture an image of a region corresponding to the first field of view. The second image capturing unit 220 may have a second field of view and may capture an image of a region corresponding to the second field of view. For example, the first and second fields of view may be 120 degrees to 180 degrees.

When image capturing is performed by the first and second image capturing units 210 and 220, a first overlapping area 215, which is the overlapping area of the first and second fields of view, may be generated. Thereafter, an omnidirectional image may be generated through image stitching in consideration of the overlapping area.

The front of the omnidirectional image processing apparatus is as illustrated in the lower part of FIG. 2.

A third image capturing unit 230 may be disposed at the front of the omnidirectional image processing apparatus. Specifically, the third image capturing unit 230 may be disposed at an end portion of the omnidirectional image processing apparatus (i.e., at an end portion of the U-shaped omnidirectional image processing apparatus). When a user wears the omnidirectional image processing apparatus around his or her neck as a wearable device, the end portion of the U-shaped omnidirectional image processing apparatus may face forward (i.e., toward the direction of the user's line of sight). The omnidirectional image processing apparatus includes first and second end portions, and the third image capturing unit 230 may be disposed at one of the first and second end portions.

The third image capturing unit 230 may perform image capturing in the same direction as the user's line of sight to capture an image of a region corresponding to the user's line of sight.

Specifically, the third image capturing unit 230 may have a third field of view and may capture an image of a region corresponding to the third field of view. For example, the third field of view may be 120 degrees to 180 degrees. When image capturing is performed by the third image capturing unit 230, a second overlapping area 225, which is the overlapping area of the first field of view of the first image capturing unit 210 and the third field of view of the third image capturing unit 230, may be generated. Also, when image capturing is performed by the third image capturing unit 230, a third overlapping area 235, which is the overlapping area of the second field of view of the second image capturing unit 220 and the third field of view of the third image capturing unit 230, may be generated.

Due to the structural characteristics of the omnidirectional image processing apparatus as a wearable device that can be worn around the neck of a user, the first and second image capturing units 210 and 220 may be positioned higher than the third image capturing unit 230 on the basis of the ground. Also, the third image capturing unit 230 may be disposed at only one end portion of the omnidirectional image processing apparatus.

In an existing omnidirectional image processing apparatus, a plurality of image capturing units may be configured to be disposed at the same height and a predetermined angle, but in the omnidirectional image processing apparatus according to an exemplary embodiment of the present inventive concept, a plurality of image capturing units may be configured to have different angles with respect to each other and to be disposed at different heights. Thus, the first, second, and third overlapping areas 215, 225, and 235, which are generated by a plurality of images captured by the plurality of image capturing units of the omnidirectional image processing apparatus according to an exemplary embodiment of the present inventive concept, may have different sizes and/or different shapes.

Thereafter, an omnidirectional image may be generated by performing image processing (such as image stitching/correction) on the first, second, and third images each generated by the first, second, and third image capturing units 210, 220, and 230 in consideration of the first, second, and third overlapping areas 215, 225, and 235.

The first, second, and third fields of view may be set to be the same, or to differ from one another, without departing from the spirit and scope of the present inventive concept.

FIG. 3 is a schematic view illustrating image capturing lines of a plurality of image capturing units according to an exemplary embodiment of the present inventive concept.

FIG. 3 illustrates image capturing lines of a plurality of image capturing units installed in an omnidirectional image processing apparatus according to an exemplary embodiment of the present inventive concept. Assuming that the ground is parallel to the X-Z plane formed by the X axis and the Z axis, the plurality of image capturing lines may be defined as lines vertically penetrating the centers of the lenses of the plurality of image capturing units included in the omnidirectional image processing apparatus according to an exemplary embodiment of the present inventive concept in a space defined by the X axis, the Y axis, and the Z axis.

In an existing omnidirectional image processing apparatus, a plurality of image capturing units may be implemented at the same height at a predetermined angle (for example, 120 degrees). In this case, a plurality of image capturing lines of the plurality of image capturing units included in the existing omnidirectional image processing apparatus may be a plurality of lines extending in parallel to the ground (or the X-Z plane) and having a predetermined angle (for example, 120 degrees) with respect to one another.

As already described above, in the omnidirectional image processing apparatus according to an exemplary embodiment of the present inventive concept, the plurality of image capturing units may have different heights (or locations) and different angles with respect to one another (or the image capturing lines of the plurality of image capturing units have different angles with respect to one another) during image capturing. Thus, the properties of the image capturing lines of the omnidirectional image processing apparatus according to an exemplary embodiment of the present inventive concept differ from the properties of the image capturing lines of the existing omnidirectional image processing apparatus.

The image capturing lines of the plurality of image capturing units, illustrated in FIG. 3, are exemplary for showing differences in properties (for example, in height and angle) between the image capturing lines of the plurality of image capturing units, resulting from the characteristics of a wearable device. Also, the image capturing lines of FIG. 3 may be image capturing lines when a user who wears the omnidirectional image processing apparatus according to an exemplary embodiment of the present inventive concept does not move or the omnidirectional image processing apparatus according to an exemplary embodiment of the present inventive concept is fixed in a particular state.

The upper part of FIG. 3 illustrates image capturing lines of first and second image capturing units 310 and 320.

The first and second image capturing units 310 and 320 may be positioned relatively higher than a third image capturing unit 330. Assuming that a user who wears the omnidirectional image capturing apparatus around is standing in a Y-axis direction, due to the structural characteristics of a wearable device that can be worn on the neck, a part of the omnidirectional image capturing apparatus with curvature (i.e., a curved/central part of a U shape) where the first and second image capturing units 310 and 320 are disposed may be relatively raised, and a leg part of the omnidirectional image capturing apparatus (i.e., an end part of the U shape) where the third image capturing unit 330 is disposed may be relatively dropped.

For example, a first image capturing line 315 of the first image capturing line 310 may be parallel to the X-Z plane and may have a first angle, a second angle, and a third angle with respect to the X axis, the Y axis, and the Z axis, respectively, at a point "a" on the Y axis.

A second image capturing line 325 of the second image capturing unit 320 may be parallel to the X-Z plane and may have a fourth angle, a fifth angle, and a sixth angle with respect to the X axis, the Y axis, and the Z axis, respectively, at the point "a" on the Y axis.

Referring to the lower part of FIG. 3, a third image capturing line 335 of the third image capturing unit 330 may be parallel to the X-Z plane and may have a seventh angle, an eighth angle, and a ninth angle with respect to the X axis, the Y axis, and the Z axis, respectively, at a point "b" on the Y axis. Here, b may be a smaller value than a. The third image capturing line 335 of the third image capturing unit 330 may be parallel to the X-Z plane and may face forward like the user's line of sight (for example, toward a direction perpendicular to the X-Y plane).

That is, the first and second image capturing lines 315 and 325 may have the same height with respect to the Y axis, and the third image capturing line 335 may be positioned relatively lower than the first and second image capturing lines with respect to the Y axis. The first, second, and third image capturing lines 315, 325, and 335 illustrated in FIG. 3 are exemplary image capturing lines having different properties, and various image capturing lines other than those set forth herein can be defined to capture an omnidirectional image.

Figure 4:
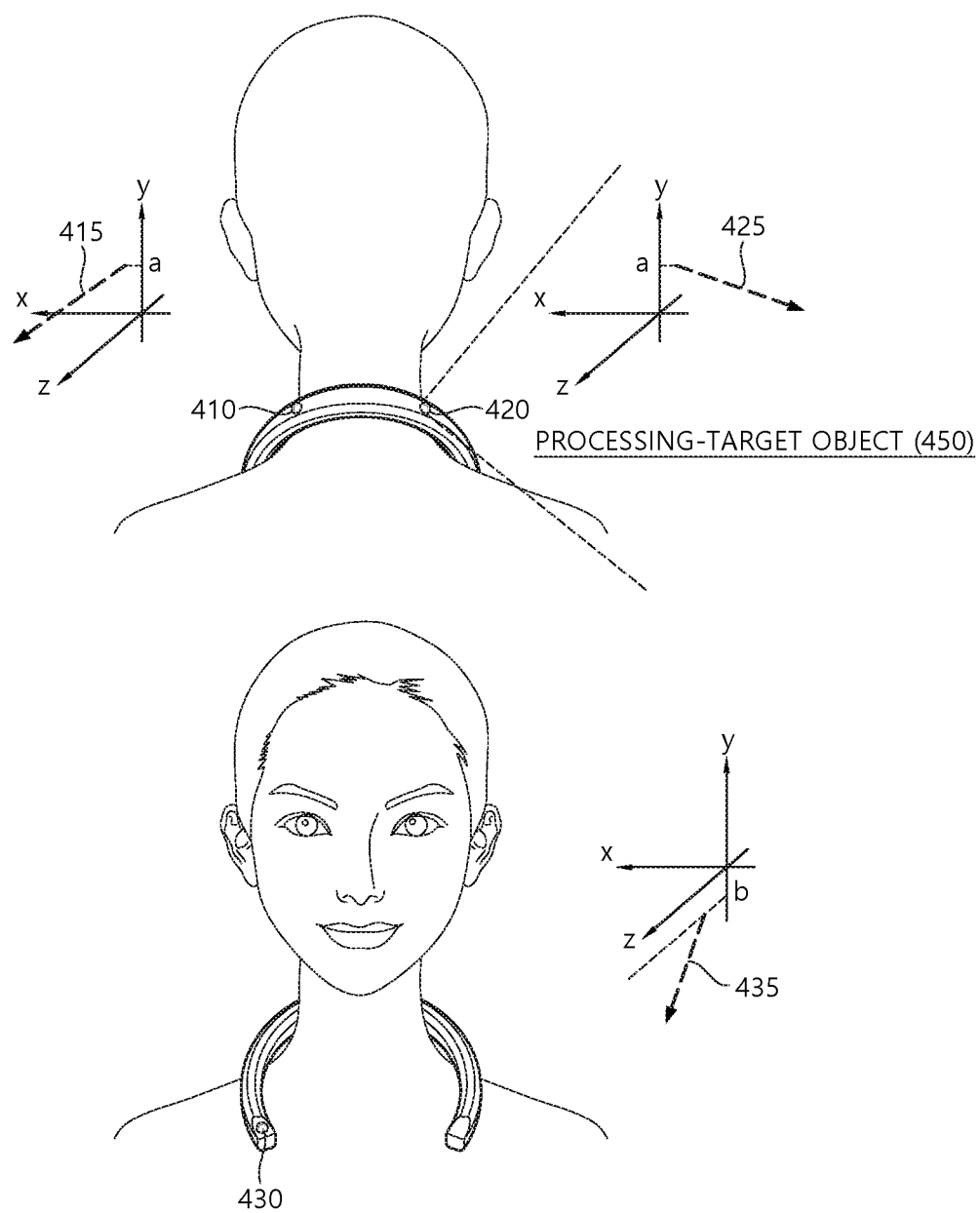
FIG. 4 is a schematic view illustrating image capturing lines of a plurality of image capturing units according to an exemplary embodiment of the present inventive concept.

FIG. 4 is a schematic view illustrating image capturing lines of a plurality of image capturing units according to an exemplary embodiment of the present inventive concept.

FIG. 4 illustrates image capturing lines of a plurality of image capturing units, which are different from those of FIG. 3. It is assumed that the ground is parallel to the X-Z plane formed by the X axis and the Z axis.

The upper part of FIG. 4 illustrates image capturing lines of first and second image capturing units 410 and 420.

The first and second image capturing units 410 and 420 may be positioned relatively higher than a third image capturing unit 430. Assuming that a user is standing in a Y-axis direction, due to the structural characteristics of a wearable device that can be worn around the neck, image capturing may be performed in a state in which a part of the omnidirectional image capturing apparatus with curvature (i.e., a curved part of a U shape) where the first and second image capturing units 410 and 420 are disposed is relatively raised and a leg part of the omnidirectional image capturing apparatus (i.e., an end part of the U shape) where the third image capturing unit 430 is disposed is relatively dropped.

For example, a first image capturing line 415 of the first image capturing line 410 may be parallel to the X-Z plane and may have a first angle, a second angle, and a third angle with respect to the X axis, the Y axis, and the Z axis, respectively, at a point "a" on the Y axis.

A second image capturing line 415 of the second image capturing unit 420 may be parallel to the X-Z plane and may have a fourth angle, a fifth angle, and a sixth angle with respect to the X axis, the Y axis, and the Z axis at the point "a" on the Y axis.

The lower part of FIG. 4 illustrates an image capturing line of the third image capturing unit 430.

A third image capturing line 435 of the third image capturing unit 430 may be parallel to the X-Z plane and may have a seventh angle, an eighth angle, and a ninth angle with respect to the X axis, the Y axis, and the Z axis, respectively, at a point "b" on the Y axis.

Since the third image capturing unit 430 is disposed at an end portion of the omnidirectional image processing apparatus, the third image capturing line may not be parallel to the X-Z plane and may have a predetermined angle (for example, 0 to 30 degrees) with respect to the X-Z plane.

That is, the first and second image capturing lines 415 and 425 may have the same height with respect to the Y axis, and the third image capturing line 435 may be positioned relatively lower than the first and second image capturing lines 415 and 425 with respect to the Y axis. Also, the first and second image capturing lines 415 and 425 may be parallel to the X-Z plane, but the third image capturing line 435 may not be parallel to the X-Z plane.

In another exemplary embodiment of the present inventive concept, the first image capturing line of the first image capturing unit may form a first' angle with respect to the X-Z plane and may have a first angle, a second angle, and a third angle with respect to the X axis, the Y axis, and the Z axis, respectively, starting from the point "a" on the Y axis. Also, the second image capturing line of the second image capturing unit may form the first' angle with respect to the X-Z plane and may have a fourth angle, a fifth angle, and a sixth angle with respect to the X axis, the Y axis, and the Z axis, respectively, starting from the point "a" on the Y axis. The third image capturing line of the third image capturing unit may form a second' angle with respect to the X-Z plane and may have a seventh angle, an eighth angle, and a ninth angle with respect to the X axis, the Y axis, and the Z axis, respectively, starting from a point "b" on the Y axis.

In yet another exemplary embodiment of the present inventive concept, the first image capturing line of the first image capturing unit may form angle 1' with respect to the X-Z plane and may have a first angle, a second angle, and a third angle with respect to the X axis, the Y axis, and the Z axis, respectively, starting from the point "a" on the Y axis. Also, the second image capturing line of the second image capturing unit may form a second' angle with respect to the X-Z plane and may have a fourth angle, a fifth angle, and a sixth angle with respect to the X axis, the Y axis, and the Z axis, respectively, starting from the point "a" on the Y axis. The third image capturing line of the third image capturing unit may form a third' angle with respect to the X-Z plane and may have a seventh angle, an eighth angle, and a ninth angle with respect to the X axis, the Y axis, and the Z axis, respectively, starting from the point "b" on the Y axis.

That is, in the omnidirectional image processing apparatus according to an exemplary embodiment of the present inventive concept, the image capturing lines of a plurality of image capturing units may be positioned at different points on the Y axis and may have different angles with respect to the ground (or the X-Z plane) unlike in an image processing apparatus where the image capturing lines of a plurality of image capturing units have the same angle with respect to the ground at a given point on the Y axis.

With a wearable omnidirectional image processing device according to an embodiment of the present invention, it is difficult to specify a subject that a user wants to image as he or she likes, and a body part is likely to be unnecessarily imaged. Like a processing-target object 450 of FIG. 4, a body part is likely to be imaged.

For example, in imaging with the omnidirectional image processing device, a body part close to the omnidirectional image processing device may be imaged. When the omnidirectional image processing device is close to the head, an image of hair and the like may be included in the captured omnidirectional image, and when the omnidirectional image processing device is in the form of a necklace, an image of the jaw and the shoulders may be mainly included in the captured omnidirectional image.

When an imaged body part is included in an omnidirectional image, the imaged body part may hinder people from enjoying the omnidirectional image. Accordingly, in the omnidirectional image processing device, it is necessary to implement a function of determining and automatically removing an object which is unnecessarily (or inappropriately) included in an omnidirectional image and a function of designating and imaging an effective imaging region so that a viewer can enjoy a high-quality imaging result.

Hereinafter, in embodiments of the present invention, an object which is unnecessarily (or inappropriately) included in an omnidirectional image may be represented by the term "processing-target object." An effective imaging region may be a region other than an imaging region including a processing-target object.

The processing-target object may be determined and processed by the omnidirectional image processing device or a separate external device which receives and processes omnidirectional image information from the omnidirectional image processing device. Hereinafter, a device which determines a processing-target object and performs image post-processing may be represented by the term "image processing device." The image processing device may include an omnidirectional image processing device and/or an external device.

The image processing device for processing a processing-target object in an image may include a communication unit for communication with an external device and a processor which is operatively connected to the communication unit. The processor may perform image processing, which will be described below, with respect to a processing-target object.

In embodiments of the present invention, a method of removing a processing-target object from an omnidirectional image is disclosed below for convenience of description. However, the present invention can be used in a method of removing a processing-target object from a general image rather than an omnidirectional image, and such an embodiment is also included in the scope of the present invention.

A method of determining a processing-target object and a method of post-processing an image with respect to a processing-target object are described in detail below.

Figure 5:
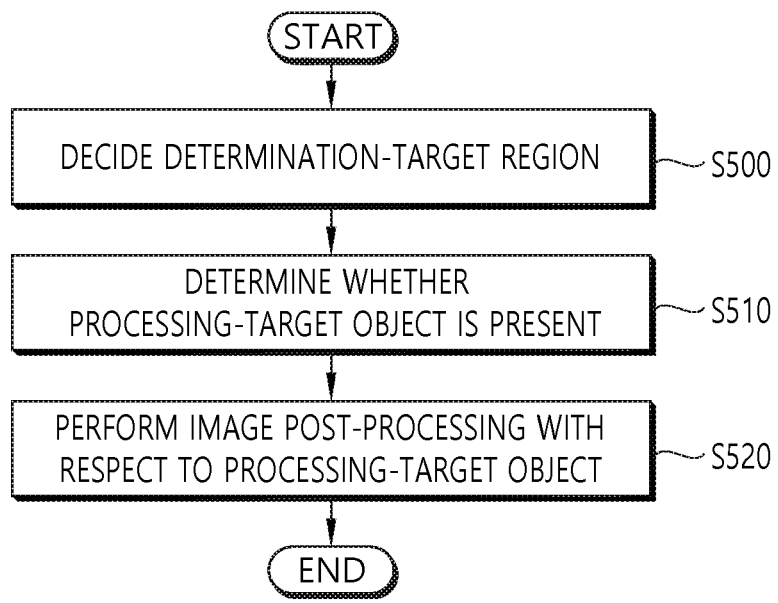
FIG. 5 is a conceptual diagram of a method of processing an image with respect to a processing-target object.

FIG. 5 is a conceptual diagram of a method of processing an image with respect to a processing-target object.

Referring to FIG. 5, a determination-target region may be decided in an omnidirectional image to determine whether a processing-target object is present (step S500).

The determination-target region may be a region for determining whether a processing-target object is present in the omnidirectional image. In other words, the determination-target region may be a region including a processing-target object which has been unintentionally imaged by an omnidirectional image processing device in the omnidirectional image.

The determination-target region may be decided in various ways. The determination-target region may be set in advance, decided on the basis of an imaging distance, or decided on the basis of learning. A method of deciding a determination-target region will be described below. The determination-target region may be set in advance, and it can be rapidly determined whether a processing-target object is present in the determination-target region.

It may be determined whether a processing-target object is in the determination-target region (step S510).

A processing-target object may be an object which has been unnecessarily (or inappropriately) imaged in the omnidirectional image. As described above, when the omnidirectional image processing device is a wearable device, a specific body part (the jaw, the shoulders, etc.) of a user may be unnecessarily (or inappropriately) imaged and included in the omnidirectional image. In other words, a processing-target object may be an object which has been unintentionally imaged.

A processing-target object may be a preset body part or an object which is imaged at a threshold distance or less from the location of an image capturing unit. For example, parts of the body, such as the jaw or the shoulders, may be imaged at a close distance of the threshold distance or less from the location of the image capturing unit, and such an object imaged at a close distance of the threshold distance or less may be decided as a processing-target object.

Alternatively, a processing-target object may be an object which has been closely imaged at the threshold distance or less from the location of the image capturing unit and thus is out of focus.

Image post-processing may be performed with respect to a processing-target object (step S520).

When there is a processing-target object in the determination-target region, image post-processing may be performed with respect to the processing-target object.

Specifically, the omnidirectional image may include a plurality of frames, and post-processing may be performed on a frame including the processing-target object. Specifically, the processing-target object may be removed or interpolated on the basis of the image information of another frame or the surrounding image information of the frame including the processing-target object. An image post-processing method will be described in detail below.

When there is not processing-target object in the determination-target region, the omnidirectional image may be provided without additional image post-processing of a processing-target object.

Also, according to an embodiment of the present invention, it may be directly determined whether a processing-target object is present in the omnidirectional image without deciding a determination-target region, and then image post-processing may be performed with respect to the processing-target object. In other words, it may be determined whether a processing-target object is present in the omnidirectional image without setting any region, and then image post-processing may be performed with respect to the processing-target object.

FIG. 6 is a set of conceptual diagrams illustrating a method of deciding a determination-target region according to an embodiment of the present invention.

FIG. 6 shows a method of deciding a determination-target region for searching an omnidirectional image for a processing-target object.

Referring to FIG. 6, when a user wears an omnidirectional image processing device on his or her neck, a processing-target object (e.g., the user's shoulder region) 600 may be imaged by the omnidirectional image processing device. In other words, an omnidirectional image may include the processing-target object 600.

A determination-target region 650 may be a region including the processing-target object 600 which has been unintentionally imaged by the omnidirectional image processing device in the omnidirectional image. In other words, the determination-target region 650 may also be defined as a region for determining whether the processing-target object 600 is present in the omnidirectional image. That is, the determination-target region 650 may be a region which is defined in advance to determine whether the processing-target object 600 is present in the omnidirectional image.

Otherwise, the determination-target region 650 may be a region outside the region of interest to be currently imaged by the omnidirectional image processing device (or an out-of-focus region). The region of interest may be a region at the focus of the omnidirectional image processing device or a region having a predetermined range based on the center of the captured omnidirectional image. Otherwise, the determination-target region 650 may be a background region which has a weak relationship with an object located at the imaging center of the omnidirectional image.

Otherwise, the determination-target region 650 may be a region having an imaging distance of a threshold distance (e.g., 30 cm) or less. The imaging distance may be the distance between an image capturing unit of the omnidirectional image processing device and an object. For example, when the omnidirectional image processing device is worn on the user's neck like the omnidirectional image processing device disclosed in the above-described embodiment of the present invention, the shoulders of the user wearing the omnidirectional image processing device may be at an imaging distance of the threshold distance or less, and regions corresponding to an imaging distance of the threshold distance or less may be determined as determination-target regions.

Figure 7:
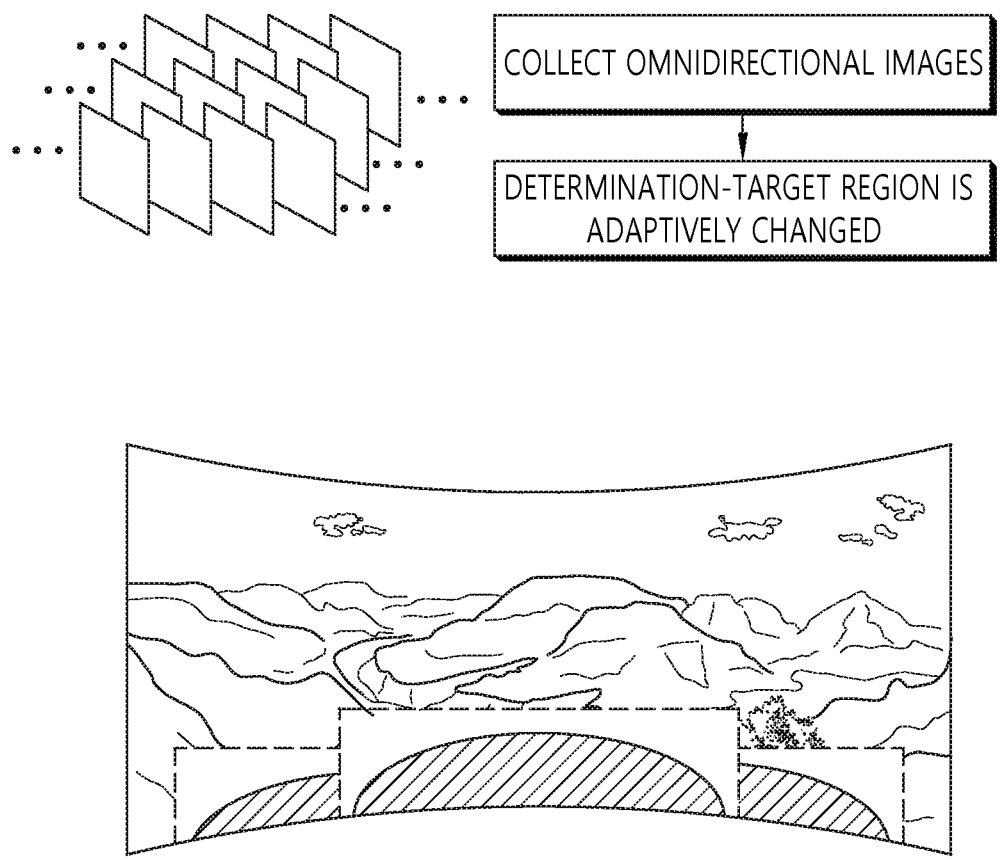
FIG. 7 is a set of conceptual diagrams illustrating a method of deciding a determination-target region according to an embodiment of the present invention.

FIG. 7 is a set of conceptual diagrams illustrating a method of deciding a determination-target region according to an embodiment of the present invention.

FIG. 7 shows a method for deciding a determination-target region including a processing-target object in an omnidirectional image. In particular, FIG. 7 shows a method of deciding a determination-target region on the basis of learning.

Referring to FIG. 7, considering the structure of an omnidirectional image processing device, a specific body part of a user (e.g., a shoulder) is highly likely to be continuously imaged in a specific region of an omnidirectional image. In this case, a region of the omnidirectional image in which the user's specific body part is highly likely to be located may be set as a determination-target region 700.

A region in which a shoulder image of the user is highly likely to be located may be set as the determination-target region 700 in advance, or the determination-target region 700 may be set by learning a region in which a shoulder image of the user is highly likely to be located.

For example, omnidirectional images captured by the omnidirectional image processing device may be collected, and a shoulder image which is present as a processing-target object in the collected omnidirectional images may be learned. In this case, the determination-target region 700 in which the processing-target object is present may be adaptively changed through learning. The location of the processing-target object in the omnidirectional images may be learned, and a region in which the probability of the processing-target object being present is a threshold percentage or more may be determined as the determination-target region 700.

Figure 8:
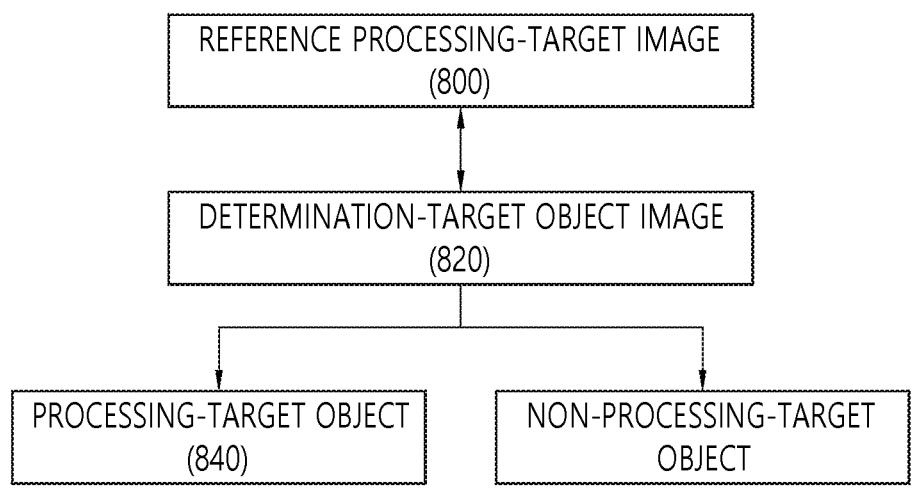
FIG. 8 is a conceptual diagram illustrating a method of deciding a processing-target object according to an embodiment of the present invention.

FIG. 8 is a conceptual diagram illustrating a method of deciding a processing-target object according to an embodiment of the present invention.

FIG. 8 shows a method for deciding a processing-target object in a determination-target region of an omnidirectional image.

Referring to FIG. 8, a processing-target object 840 may be set in advance. As described above, when an omnidirectional image is a wearable device, a specific body part (the jaw, the shoulders, etc.) may be imaged as the processing-target object 840.

A determination-target region in which the processing-target object 840 is likely to be present may be determined in an omnidirectional image, or it may be determined whether the processing-target object 840 is present in the entire region of the omnidirectional image. When the processing-target object 840 is present in the omnidirectional image, the processing-target object 840 may be removed through image post-processing or interpolated on the basis of the surrounding image information of a frame including the processing-target object 840 and/or the image information of another frame. An image post-processing method will be described in detail below.

To decide whether the processing-target object 840 is present in the determination-target region, a template image of the processing-target object 840 may be stored as a reference processing-target image 800 in advance. When a processing-target object image is the image of a user's jaw, shoulder, or the like which is unnecessarily imaged due to the structure of the omnidirectional image processing device, the reference processing-target image 800 may be an image which is a criterion for determining the image of a user's jaw, shoulder, or the like unnecessarily imaged in an omnidirectional image.

It may be determined whether a determination-target object is the processing-target object 840 on the basis of a comparison between the reference processing-target image 800 and a determination-target object image 820 included in the captured omnidirectional image.

For example, when object 1, object 2, and object 3 is present in the determination-target region, object 1, object 2, and object 3 may be determination-target objects, and the image of each of object 1, object 2, and object 3 may be the determination-target object image 820.

The similarity (or the degree of matching) between the determination-target object image 820 and the reference processing-target image 800 is analyzed. When the similarity is high, the determination-target object may be decided as a processing-target object.

According to an embodiment of the present invention, the processing-target object may also be learned. As described above, through continuous learning of processing-target objects included in omnidirectional images, the reference processing-target image 800 may be updated, and the accuracy in determining a processing-target object may be increased.

When the processing-target object 840 is not set in advance, the following image may be set as the determination-target object.

For example, the determination-target object may be 1) an object which is present for a threshold time in the determination-target region, 2) an object which repeatedly appears in the determination-target region, 3) an object which is present for the threshold time in the determination-target region or repeatedly appears in the determination-target region even when the imaging location of the omnidirectional image processing device is moved, 4) an object which is present for a threshold time in the omnidirectional image, 5) an object which repeatedly appears in the omnidirectional image, or 6) an object which is present for the threshold time in the omnidirectional image or repeatedly appears in the omnidirectional image even when the imaging location of the omnidirectional image processing device is moved.

When there is such a determination-target object, the user who has captured the omnidirectional image may be requested to determine whether to post-process the object.

For example, when the images of the user's hair and jaw are determined as determination-target objects, the user may be requested to determine whether to perform image post-processing on the images of the user's hair and jaw. When the user requests image post-processing with respect to the corresponding objects, image post-processing may be performed with respect to the objects.

Figure 9:
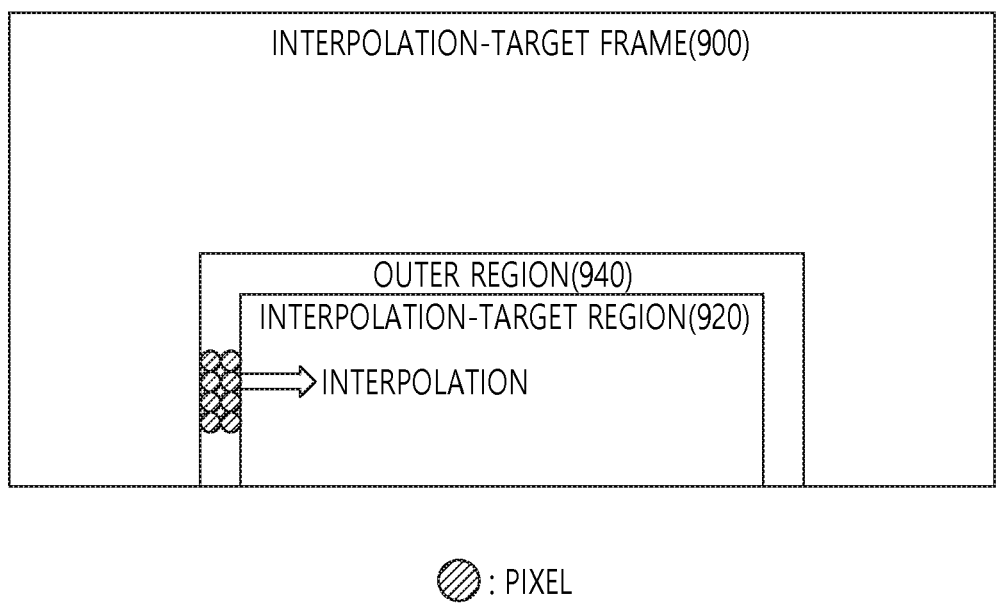
FIG. 9 is a conceptual diagram illustrating a method of post-processing an image with respect to a processing-target object according to an embodiment of the present invention.

FIG. 9 is a conceptual diagram illustrating a method of post-processing an image with respect to a processing-target object according to an embodiment of the present invention.

FIG. 9 shows a method of post-processing an image with respect to a processing-target object. In particular, FIG. 9 shows a method of interpolating an image region including a processing-target object on the basis of the surrounding image information of a target frame including the processing-target object.

Referring to FIG. 9, an omnidirectional image may be generated through image interpolation with respect to a region including a processing-target object. A frame including the processing-target object may be represented by the term "interpolation-target frame 900," and a region in which the processing-target object is included and image-interpolation will be performed may be represented by the term "interpolation-target region 920."

Specifically, image interpolation may be performed on the basis of surrounding pixel information of the target frame to generate a post-processed omnidirectional image.

When the interpolation-target region 920 of the interpolation-target frame 900 includes a processing-target object, image interpolation may be performed with respect to the interpolation-target region 920 on the basis of information on pixels located in an outer region 940 of the interpolation-target region 920. For example, the outer region 940 may be a region in which n (which is a natural number) pixels are located in the opposite direction from the center of the processing-target object on the basis of the outer line of the interpolation-target region 920 or a region including pixels located at a predetermined distance in the opposite direction from the center of the processing-target object on the basis of the outer line thereof.

The interpolation-target region 920 may be interpolated on the basis of information on pixels located in the outer region 940 in various ways.

The interpolation-target region 920 may be divided into a plurality of interpolation-target sub-regions, and each of the interpolation-target sub-regions may be interpolated on the basis of the pixel information (luminance information, chrominance information, etc.) of the closest outer region.

To improve interpolation accuracy, the plurality of interpolation-target sub-regions may be divided by considering the pixel characteristics of the outer region 940. For example, the plurality of interpolation-target sub-regions may be divided by considering the degree of change in the pixel characteristics of the outer region 940. Specifically, it may be determined whether the degree of change in luminance information and chrominance information of pixels included in the outer region 940 is a predetermined threshold degree of change, and the outer region 940 may be divided. Interpolation accuracy may be improved through such division.

Figure 10:
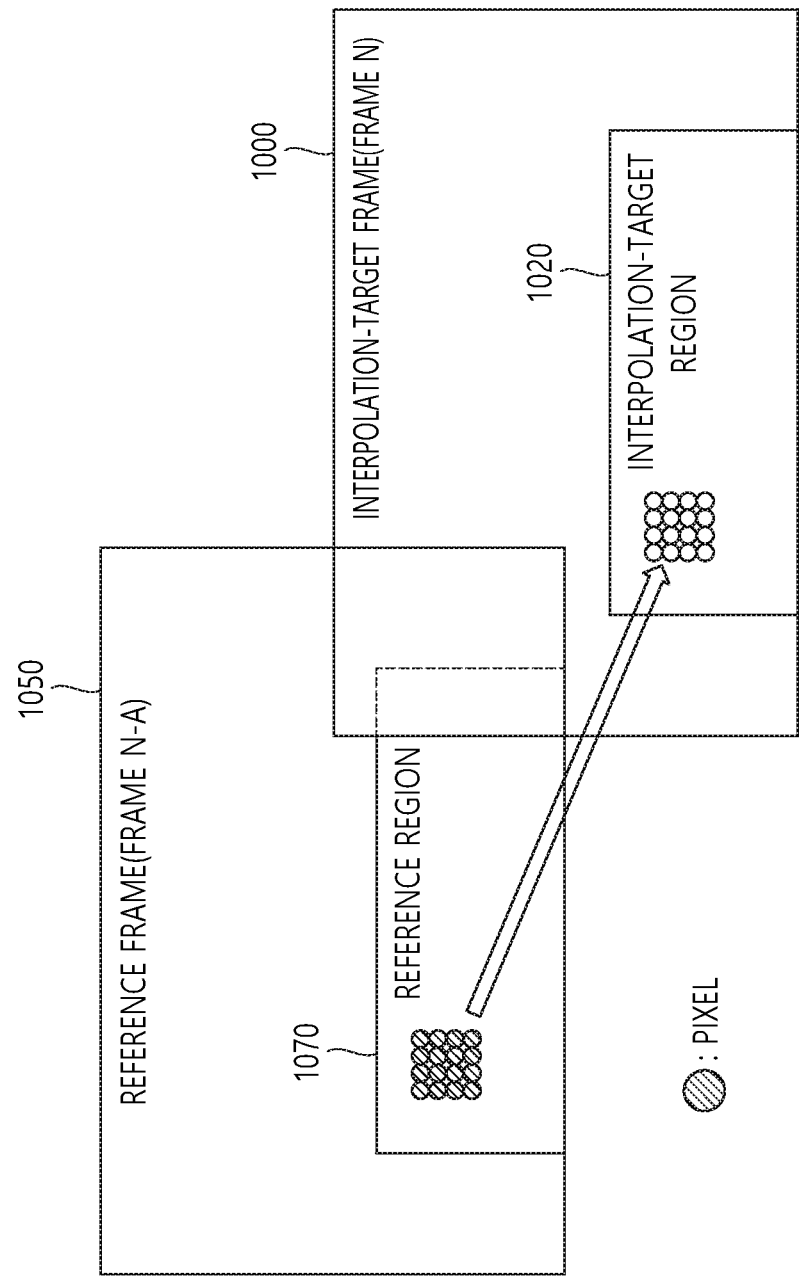
FIG. 10 is a conceptual diagram illustrating a method of post-processing an image with respect to a processing-target object according to an embodiment of the present invention.

FIG. 10 is a conceptual diagram illustrating a method of post-processing an image with respect to a processing-target object according to an embodiment of the present invention.

FIG. 10 shows a method of post-processing an image with respect to a processing-target object. In particular, FIG. 10 shows a method of interpolating an image region including a processing-target object by considering the image information of a previous frame on the basis of a target frame including the processing-target object.

Referring to FIG. 10, an $n^{th}$ frame may be an interpolation-target frame 100, and an interpolation-target region 1020 may include a processing-target object. An $(n-a)^{th}$ frame which is a reference frame 1050 may be a frame that is consulted for image post-processing of the interpolation-target frame 1000. The reference frame 1050 may be a frame generated within a threshold time from the generation time point of the interpolation-target frame 1000. Alternatively, the reference frame 1050 may be a frame that is consulted for decoding/encoding of the interpolation-target frame 1000 or a frame having a relatively high similarity in image characteristic information with the interpolation-target frame 1000. The interpolation-target region 1020 may be interpolated on the basis of the image information of a reference region included in the reference frame 1050.

For convenience of description, the single reference frame 1050 and one reference region 1070 are illustrated. However, there may be a plurality of reference frames and reference regions, and image information of the plurality of reference frames may be used to interpolate the interpolation-target frame 1000.

The reference frame 1050 may be decided by considering the image information of the interpolation-target frame 1000. When the similarity between the image information of a consulted frame and the image information of an interpolation-target frame is not high, the sense of difference of an interpolated image may increase further. In this case, image interpolation procedure based on a reference region may not be performed.

A frame whose similarity is determined to decide the reference frame 1050 may be represented by the term "candidate reference frame." The candidate reference frame may include a candidate reference region corresponding to the interpolation-target region 1020. On the basis of the similarity between interpolation-target frames, the candidate reference frame may be decided as the reference frame, and the candidate reference region may be decided as the reference region.

The similarity between the image information of the candidate reference frame and the image information of the interpolation-target frame 1000 may be decided on the basis of the pixel characteristic information of an outer region of the candidate reference region in the candidate reference frame and the pixel characteristic information of an outer region of the interpolation-target region 1020. Specifically, it is possible to decide the similarity between the pixel characteristic information (e.g., luminance information and chrominance information) of an outer region of the candidate reference region and the pixel characteristic information (e.g., luminance information and chrominance information) of an outer region of the interpolation-target region 1020.

As described above, the outer region may be a region in which n (which is a natural number) pixels are located in the opposite direction from the center of the processing-target object on the basis of the outer line of the interpolation-target region 1020 or a region including pixels located at a predetermined distance in the opposite direction from the center of the processing-target object on the basis of the outer line thereof.

A similarity may be decided through a comparison between the pixel characteristic information of the interpolation-target region 1020 and the pixel characteristic information of the candidate reference region. Alternatively, the outer region of the interpolation-target region 1020 may be divided into a plurality of first outer sub-regions, the outer region of the candidate reference region may be divided into a plurality of second outer sub-regions, and a similarity in pixel characteristic information may be decided by comparing each of the plurality of first outer sub-regions with each of the plurality of second outer sub-regions. When the similarity is a threshold similarity or more, the candidate reference frame may be decided as the reference frame 1050, and the candidate reference region may be decided as the reference region 1070.

The interpolation-target region 1020 may be interpolated on the basis of information on an image located in the reference region 1070 in various ways.

The information on the image located in the reference region may be used as the image information of the interpolation-target region 1020. Alternatively, the interpolation-target region 1020 may be divided into a plurality of interpolation-target sub-regions, and each of the interpolation-target sub-regions may be interpolated on the basis of the pixel information (luminance information, chrominance information, etc.) of the closest outer region. To improve interpolation accuracy, the plurality of interpolation-target sub-regions may be divided by considering the pixel characteristics of the outer region. For example, the plurality of interpolation-target sub-regions may be divided by considering the degree of change in the pixel characteristics of the outer region.

The method of FIG. 9 for interpolating an interpolation-target region on the basis of the image information of an interpolation-target frame and the method of FIG. 10 for performing image interpolation on the basis of the image information of a reference region may be used in combination.

For example, the interpolation-target region may be interpolated by considering both information on pixels located in the outer region of the interpolation-target region 1020 and pixel information of the reference region 1070. Specifically, the central portion of the interpolation-target region 1020 may be interpolated by considering the pixel information of the reference region 1070, and the outer portion of the interpolation-target region 1020, which is the interpolation-target region 1020 other than the central portion, may be interpolated by considering information on pixels located in the outer region of the interpolation-target region 1020.

Alternatively, a region including a processing-target object may be deleted without interpolation. A region in which a region including a processing-target object is deleted without interpolation may be a removal-target region. For example, when a user's shoulder image is continuously captured in a predetermined region of an omnidirectional image, the shoulder image may be decided as a processing-target object, and a region including the shoulder image (or a removal-target region including the shoulder image) may be removed so that a post-processed omnidirectional image may be generated. The removal-target region may be a region corresponding to a field of view within a predetermined range and may be removed from the omnidirectional image.

Figure 11:
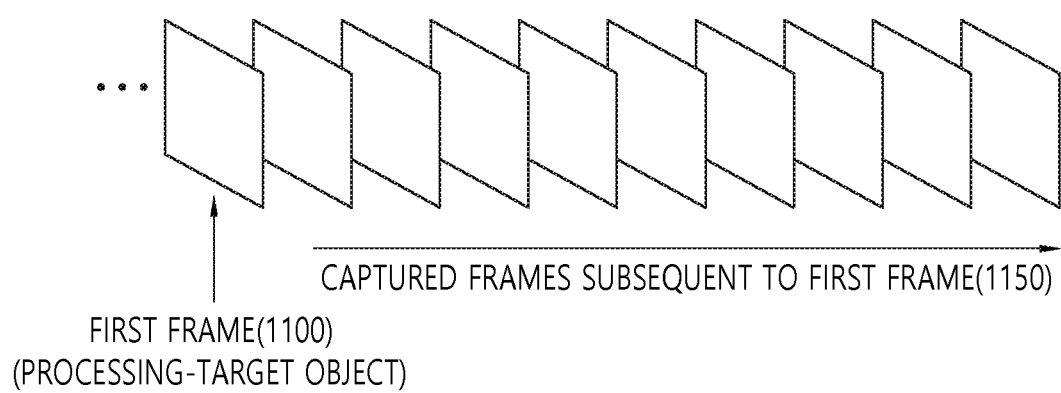
FIG. 11 is a conceptual diagram illustrating a method of post-processing an image with respect to a processing-target object according to an embodiment of the present invention.

FIG. 11 is a conceptual diagram illustrating a method of post-processing an image with respect to a processing-target object according to an embodiment of the present invention.

FIG. 11 shows a method of determining a processing-target object.

Referring to FIG. 11, determining whether a processing-target object is present in each frame may be a load on image post-processing. Consequently, an additional determination may be made with respect to a processing-target object in frames subsequent to a specific frame on the basis of the determination result of a processing-target object in the specific frame.

Specifically, according to the above-described method, it may be decided that a processing-target object is present in a first frame 1100. When a processing-target object is present in the first frame 1100, the processing-target object is highly likely to continuously appear in captured frames 1150 subsequent to the first frame. Consequently, it may be determined whether a processing-target object is present in the captured frames 1150 on the basis of the processing-target present in the first frame 1100.

Characteristic information of the processing-target object present in the first frame 1100 may be extracted, and it may be determined whether an object having characteristic information similar to that of the processing-target object is present in the captured frames 1150 subsequent to the first frame. That is, the processing-target image of the first frame 1100 may be set as a criterion, and then it may be decided whether a processing-target object is present in the captured frames 1150 subsequent to the first frame on the basis of a similarity with the processing-target object image of the first frame 1100.

In other words, it may not be determined whether a processing-target object is present in each of the captured frames 1150 subsequent to the first frame, and it may be decided whether a processing-target object is included in the subsequent frames by continuously determining whether the processing-target object is present in the first frame 1100. Whether the processing-target object is present may be continuously determined on the basis of the motion vector of an object or performed within a set determination-target region.

FIG. 12 is a conceptual diagram illustrating operation of an omnidirectional image processing device according to an embodiment of the present invention.

FIG. 12 shows operation of an omnidirectional image processing device.

Referring to FIG. 12, as described above, an omnidirectional image processing device 1200 may include a plurality of image capturing units 1250.

The lens unit of each of the plurality of image capturing units 1250 can be physically operated on the basis of hardware, and thus the field of view (or the angle of an imaging line) in a specific direction can be adjusted, or the field of view (or the angle of an imaging line) in a specific direction can be adjusted on the basis of software.

According to an embodiment of the present invention, determination result information of a processing-target object may be fed back to the omnidirectional image processing device 1200. The omnidirectional image processing device 1200 may decide information on the field of view (or the angle of an imaging line) in a specific direction to be changed on the basis of the determination result information of the processing-target object and control operation of each of the plurality of image capturing units 1250.

Alternatively, information on the field of view (or the angle of an imaging line) in a specific direction to be changed (hereinafter, operation control information) may be decided on the basis of the determination result information of the processing-target object, and the omnidirectional image processing device 1200 may control operation of each of the plurality of image capturing units 1250 on the basis of the fed-back operation control information.

The location of the processing-target object may be decided in the omnidirectional image, and the operation control information may be decided on the basis of the location of the processing-target object. The operation control information may include information on the field of view for capturing an omnidirectional image without the processing-target object.

A first field of view for capturing an omnidirectional image without the processing-target object may be decided, and information on the first field of view may be transmitted to the omnidirectional image processing device 1200 as first operation control information.

An image capturing unit 1250 of the omnidirectional image processing device 1200 may change the field of view on the basis of the first operation control information. It may be additionally determined whether an omnidirectional image captured according to the field of view changed on the basis of the first operation control information includes a processing-target object. When the omnidirectional image includes a processing-target object, second operation control information for additional operation control may be generated and transmitted to the omnidirectional image processing device 1200.

In other words, when the field of view is adjusted in such a feedback manner, an image captured by the omnidirectional image processing device 1200 may not include a processing-target object, or a region in which a processing-target object is shown may be reduced as much as possible.

In adjusting the field of view of the omnidirectional image processing device 1200, the range of the adjusted field of view may be limited so that an image may not be reduced in size due to excessive adjustment of the field of view. For example, when the limited or adjusted field of view has a wide range, the field of view of the omnidirectional image may not be partially imaged. Consequently, an adjustable range of the field of view may be set, and the field of view may be set so that the field of view may not be adjusted to deviate from the adjustable range.

The above-described exemplary embodiments of the present inventive concept may be implemented in the form of a program command that can be performed through various computer components, and may be recorded on a computer-readable storage medium. The computer-readable storage medium may include a program command, a data file, and a data structure individually or a combination thereof. The program command recorded in the computer-readable storage medium may be specially designed and configured for the present inventive concept, or may be known to those skilled in a computer software field to be used. Examples of the computer-readable storage medium include a magnetic medium such as a hard disk, a floppy disk, and a magnetic tape, an optical medium such as a CD-ROM and a DVD, a magneto-optical medium such as a floptical disk, and a hardware device such as a ROM, a RAM, and a flash memory, that are specially configured to store and perform program commands Examples of the program commands may include a machine code generated by a compiler and a high-level language code that can be executed in a computer using an interpreter. The hardware device may be configured as at least one software-module in order to perform the operations of the present inventive concept, and vice versa.

While the present inventive concept has been described with reference to specific details, such as detailed components, specific embodiments, and drawings, these are only examples to facilitate the overall understanding of the present inventive concept and the present inventive concept is not limited thereto. It will be understood by those skilled in the art that various modifications and changes can be made from the descriptions above.

Therefore, the spirit of the present inventive concept is defined not by the detailed description of the present inventive concept, but by the appended claims, and encompasses all modifications and equivalents that fall within the scope of the appended claims.

The invention claimed is:

1. A method of removing a processing-target object from an image, the method comprising:
    determining, by an image processing device, the processing-target object in the image; and
    performing, by the image processing device, image post-processing with respect to the processing-target object,
    wherein the processing-target object is an object which has been unintentionally imaged,
    wherein the processing-target object is determined based on at least one condition that the object is imaged when the object is located at a predetermined threshold distance or less from the image processing device,
    wherein the processing-target object is determined further based on the at least one condition that the object is in the image for a predetermined time during the image processing device is moved, or the object appears repeatedly in the image during the image processing device is moved,
    wherein the processing-target object is removed from the image, and an interpolation-target region including the processing-target object is interpolated on the basis of a frame including the processing-target object and/or a frame adjacent to the frame, wherein the interpolation-target region is interpolated based on information on pixels located in an outer region of the interpolation-target region, the outer region includes pixels located at a predetermined distance in an opposite direction from a center of the processing-target object, and the information on the pixels of the outer region includes luminance information and chrominance information, wherein the interpolation-target region is divided as a plurality of interpolation-target sub-regions based on a predetermined threshold degree of change of the luminance information and the chrominance information on the pixels of the outer region.

2. The method of claim 1, wherein it is determined whether the processing-target object is present in a determination-target region, and the determination-target region is decided by learning imaging locations of objects which are included in a plurality of images and identical to the processing-target object.

3. The method of claim 2, wherein the image is an omnidirectional image generated by an omnidirectional image processing device including a plurality of image capturing units, and the omnidirectional image processing device is a wearable device.

4. The method of claim 3, wherein the processing-target object is a body part of a user wearing the omnidirectional image processing device.

5. The image processing device of claim 1, wherein the processing-target object is removed from the image, and an interpolation-target region including the processing-target object is interpolated on the basis of a frame including the processing-target object and/or a frame adjacent to the frame.

6. The method of claim 1, wherein the interpolation-target region is further interpolated based on at least one reference frame, the interpolation-target region is included in an interpolation-target frame, the at least one reference frame is generated within a threshold time from a time point of the interpolation-target frame, the at least one reference frame includes the reference region corresponding to the interpolation-target region, and the at least one reference frame is determined based on luminance and chrominance information of the reference region.

7. An image processing device for removing a processing-target object from an image, the image processing device comprising:

a communication unit configured to communicate with an external device; and a processor configured to be operatively connected to the communication unit, wherein the processor decides the processing-target object in the image and performs image post-processing with respect to the processing-target object, and the processing-target object is an object which has been unintentionally imaged, wherein the processing-target object is determined based on at least one condition that the object is imaged when the object is located at a predetermined threshold distance or less from the image processing device, wherein the processing-target object is determined further based on the at least one condition that the object is in the image for a predetermined time during the image processing device is moved, or the object appears repeatedly in the image during the image processing device is moved, wherein the processing-target object is removed from the image, and an interpolation-target region including the processing-target object is interpolated on the basis of a frame including the processing-target object and/or a frame adjacent to the frame, wherein the interpolation-target region is interpolated based on information on pixels located in an outer region of the interpolation-target region, the outer region includes pixels located at a predetermined distance in an opposite direction from a center of the processing-target object, and the information on the pixels of the outer region includes luminance information and chrominance information, wherein the interpolation-target region is divided as a plurality of interpolation-target sub-regions based on a predetermined threshold degree of change of the luminance information and the chrominance information on the pixels of the outer region.

8. The image processing device of claim 7, wherein it is determined whether the processing-target object is present in a determination-target region, and the determination-target region is decided by learning imaging locations of objects which are included in a plurality of images and identical to the processing-target object.

9. The image processing device of claim 8, wherein the image is an omnidirectional image generated by an omnidirectional image processing device including a plurality of image capturing units, and the omnidirectional image processing device is a wearable device.

10. The image processing device of claim 9, wherein the processing-target object is a body part of a user wearing the omnidirectional image processing device.

* * * * *